United States Patent
Tsuda et al.

[11] Patent Number: 5,945,490
[45] Date of Patent: Aug. 31, 1999

[54] POLYARYLENE SULFIDE AND A COMPOSITION THEREOF

[75] Inventors: Takashi Tsuda; Osamu Komiyama, both of Chiba, Japan

[73] Assignee: Tonen Chemical Corporation, Tokyo, Japan

[21] Appl. No.: 08/952,286

[22] PCT Filed: Apr. 2, 1997

[86] PCT No.: PCT/JP97/01138

§ 371 Date: Nov. 10, 1997

§ 102(e) Date: Nov. 10, 1997

[30] Foreign Application Priority Data

| Apr. 2, 1996 | [JP] | Japan | 8-104588 |
| Apr. 16, 1996 | [JP] | Japan | 8-117147 |
| Apr. 16, 1996 | [JP] | Japan | 8-117148 |

[51] Int. Cl.$^6$ .............. C08G 75/02; C08K 5/54; C08L 81/02
[52] U.S. Cl. ........... 525/537; 528/373; 528/388; 528/486; 528/488; 528/489; 528/492; 528/499; 528/502 A
[58] Field of Search ............ 525/537; 528/373, 528/388, 486, 488, 489, 492, 499, 502 A

[56] References Cited

U.S. PATENT DOCUMENTS

| 3,354,129 | 11/1967 | Edmonds et al. | 260/79 |
| 3,562,199 | 2/1971 | Hill, Jr. et al. | 260/37 |
| 4,016,145 | 4/1977 | Campbell | 260/79.3 M |
| 5,342,920 | 8/1994 | Imai et al. | 528/388 |

FOREIGN PATENT DOCUMENTS

| 0 074 632 | 3/1983 | European Pat. Off. |
| 0 286 257 | 10/1988 | European Pat. Off. |
| 0 299 276 | 1/1989 | European Pat. Off. |
| 0 319 300 | 6/1989 | European Pat. Off. |
| 0 468 599 | 1/1992 | European Pat. Off. |
| 0 648 797 | 4/1995 | European Pat. Off. |
| 1-63115 | 2/1987 | Japan . |
| 2-38211 | 2/1989 | Japan . |
| 1-193360 | 8/1989 | Japan . |
| 2-272063 | 11/1990 | Japan . |
| 3-43452 | 2/1991 | Japan . |
| 4-198267 | 7/1992 | Japan . |
| 4-275368 | 9/1992 | Japan . |
| 45-3368 | 9/1992 | Japan . |
| 5-25388 | 2/1993 | Japan . |
| 5-171041 | 7/1993 | Japan . |
| 6-57136 | 3/1994 | Japan . |
| 6-107946 | 4/1994 | Japan . |
| 52-12240 | 6/1994 | Japan . |
| 6-166816 | 6/1994 | Japan . |
| 6-256517 | 9/1994 | Japan . |

*Primary Examiner*—Frederick Krass
*Attorney, Agent, or Firm*—Cowan, Liebowitz & Latman, P.C.; William H. Dippert

[57] ABSTRACT

Polyarylene sulfide (PAS) is disclosed, of which extract with methylene chloride is in an amount of not more than 0.7% by weight, a melt viscosity $V_6$ is 20 to 15,000 poises and a content of —SX groups is at least 15 micro moles/g, wherein X represents an alkali metal or a hydrogen atom. The PAS is prepared as follows: an alkali metal sulfide is reacted with a dihaloaromatic compound in an organic amide solvent, while a part of a gaseous phase in a reactor is condensed by cooling a gaseous phase part of the reactor to return the condensed liquid to a liquid phase; and the polyarylene sulfide thus prepared is washed with an organic solvent and then with water. The present invention also provides a composition comprising 100 parts by weight of (A) the aforesaid PAS and 0.01 to 5.0 parts by weight of (B) at least a silane compound selected from the group consisting of methacryloxysilane compounds, ureidosilane compounds and epoxy silane compounds.

15 Claims, No Drawings

POLYARYLENE SULFIDE AND A COMPOSITION THEREOF

FIELD OF THE INVENTION

The present invention relates to polyarylene sulfide and a process for the preparation thereof. The present invention also relates to a composition comprising the polyarylene sulfide and a molded article thereof.

PRIOR ART

There has been a need for a thermoplastic resin which has high heat resistance and chemical resistance as a material for electric and electronic parts, automobile parts or chemical apparatus parts. Recently, polyarylene sulfide (hereinafter referred to as PAS), typically polyphenylene sulfide (hereinafter referred to as PPS), has drawn attention as one of resins which meet such a need.

A process for the preparation of PAS is described in Japanese Patent Publication No. Sho-45-3368/1970, in which an alkali metal sulfide is reacted with a dihaloaromatic compound in an organic amide solvent. However, this process cannot give PAS having a high molecular weight.

Accordingly, PAS having a low molecular weight as mentioned above is subjected to heat acidifying treatment for cross-linking to obtain PAS having a high molecular weight. However, the cross-linked PAS thus obtained is inferior in mechanical strength such as impact strength. In addition, such PAS has also a drawback of being inferior in processability. Several methods have been proposed in order to improve the mechanical strength such as impact resistance.

In Japanese Patent Publication No. Sho-52-12240/1977, the polymerization is conducted in the presence of metal carboxylates such as sodium acetate and lithium acetate in order to prepare high molecular PAS. However, the above compounds are expensive. Moreover, large equipments, technology and costs are needed for separating and recovering the above compounds. This method is thus extremely disadvantageous. In addition, as the PAS obtained did not have enough reactivity with an epoxy type silane coupling agent, it was impossible to sufficiently enhance mechanical strength such as impact strength by adding the epoxy type silane coupling agent.

In Japanese Patent Publication No. Hei-6-39113/1994, there is disclosed a composition comprising PAS, a silane compound such as epoxyalkoxy silane and an inorganic filler. However, the reactivity of PAS with the silane compound is not enough to improve its mechanical strength such as impact strength.

In Japanese Patent Application Laid-open No. Hei-6-256517/1994, there is disclosed PAS which has a particular melt flow rate and shows a particular degree of increase in melt viscosity after 1% of gamma-glycidoxypropyltrimethoxysilane is added. However, it is necessary to add an alkali metal hydroxide to a reaction system in the preparation of the PAS. Accordingly, the above process is very disadvantageous for an industrial scale of the preparation of PAS because of its higher costs. Moreover, large equipments, technology and costs are needed for separating and recovering the above compound. This is another large disadvantage.

Meanwhile, PAS is relatively poor in adhesion to other resins, particularly epoxy resins. Accordingly, there has been a problem of poor adhesion property of PAS when PAS is bonded to PAS or to other resins with an epoxy type adhesive or when electric or electronic parts are sealed with an epoxy resin.

Accordingly, various attempts have been done in order to improve adhesion of PAS to epoxy resins. For example, there are disclosed a PPS resin composition comprising a carnauba wax in Japanese Patent Application Laid-open No. Hei-2-272063/1990; a PPS resin composition in which a fibrous and/or nonfibrous filler and polyalkylene ether are blended in Japanese Patent Application Laid-open No. Hei-4-275368/1992; a PPS resin composition comprising a highly water absorbing resin such as a cross-linked polyacrylic acid salt in Japanese Patent Application Laid-open No. Hei-5-171041/1993; a PPS resin composition in which an aromatic sulfone compound and a fibrous and/or nonfibrous filler are blended in Japanese Patent Application Laid-open No. Hei-6-57136/1994; a PPS resin composition in which an aliphatic polyester and fiberous and/or nonfiberous filler are blended in Japanese Patent Application Laid-open No. Hei-6-107946/1994; and a PPS resin composition in which poly(ethylene cyclohexane dimethylene terephthalate) copolymer is blended in Japanese Patent Application Laid-open No. Hei-6-166816/1994. However, heat resistance is low in all of the resin compositions mentioned above, because they contains a material of which heat resistance is lower than that of PPS. Moreover, some of the resin compositions show remarkable decrease in mechanical strength.

There are also described a PAS resin composition comprising a carboxyl group-containing PAS in Japanese Patent Application Laid-open No. Hei-4-198267/1992, and a PAS resin composition comprising an amino group-containing PAS in Japanese Patent Application Laid-open No. Hei-5-25388/1993. These are prepared, for example, by copolymerizing dichlorobenzene having a carboxy group or an amino group. Therefore, there is such a problem caused in a process that these dichlorobenzenes remain in a reaction system. Further, the adhesive strength of PAS obtained is not sufficient.

Meanwhile, PAS also has a drawback that mechanical strength such as toughness is very low at a part where the forefronts of two or more resin flows merge in a mold cavity in a molding process, that is, a weld part. Accordingly, there is a problem that a weld part is first destroyed when subjected to heat or mechanical stress.

Various methods have been proposed to improve mechanical strength of a weld part such as toughness.

In Japanese Patent Publication No. Hei-6-39113/1994, there is described a resin composition in which PAS, a silane compound such as epoxy alkoxy silane and an inorganic filler are blended. In Japanese Patent Publication No. Hei-6-51311/1994, there is described a resin composition in which PAS, amino alkoxy silane and an inorganic filler are blended. In Japanese Patent Application Laid-open Nos. Hei-1-193360/1989 and Hei-3-43452/1991, there is described a resin composition in which PAS, ureido silane and an inorganic filler are blended. However, the reactivity of PAS with the above silane compounds is not sufficient and, accordingly, improvement in mechanical strength of a weld part such as toughness is not sufficient. In addition, PAS is prepared in a process where the reaction is conducted in two steps and water is added in each step, or alkali metal carboxylate such as sodium acetate and lithium acetate is used as a polymerization assistant agentin a reaction system, or a low molecular weight PAS is subjected to heat acidifying treatment to obtain a high molecular weight PAS. These processes, therefore, have a drawback that preparation costs of PAS is large or that it is impossible to obtain PAS having sufficient mechanical strength.

BRIEF DESCRIPTION OF THE INVENTION

A purpose of the invention is to provide a novel PAS which is prepared without using the aforesaid expensive polymerization assistant agent and, therefore, is cheap and has enough reactivity with an epoxy type silane coupling agent, whereby improvement of mechanical strength such as impact strength may be effected by only a little amount of a polymerization assistant agent.

Thus, the present invention provides a polyarylene sulfide, characterized in that an extract thereof with methylene chloride is in an amount of not more than 0.7% by weight, a melt viscosity $V_6$ is 20 to 15,000 poises and a content of —SX groups is at least 15 micro moles/g, wherein X represents an alkali metal or a hydrogen atom.

The present invention also provides a process for the preparation of the polyarylene sulfide mentioned above, wherein an alkali metal sulfide is reacted with a dihaloaromatic compound in an organic amide solvent, while a part of a gaseous phase in a reactor is condensed by cooling a gaseous phase part of the reactor to return the condensed liquid to a liquid phase, characterized in that the polyarylene sulfide (i) thus prepared is washed with an organic solvent and then with water.

Another purpose of the present invention is to provide a PAS resin composition having excellent adherence to epoxy resin in addition to high heat resistance and mechanical strength which the prior PAS has.

Thus, the present invention also provides a composition comprising 100 parts by weight of (A) a polyarylene sulfide and 0.01 to 5.0 parts by weight of (B) at least a silane compound, characterized in that the polyarylene sulfide has an extract with methylene chloride of not more than 0.7% by weight, a melt viscosity, $V_6$, of 20 to 15,000 poises and a content of —SX groups of at least 15 micro moles/g, wherein X represents an alkali metal or a hydrogen atom, and the silane compound is selected from the group consisting of methacryloxy silane compounds, ureido silane compounds and epoxy silane compounds. The silane compound (B) is preferably selected from the group consisting of methacryloxy silane compounds and ureido silane compounds.

A further purpose of the present invention is to provides a molded article of PAS composition wherein mechanical strength such as toughness of its weld part is high and is cheaply prepared.

Thus, the present invention also provides a molded article having a weld part, obtained by injection molding the composition mentioned above, wherein the silane compound (B) is the epoxy silane compound.

PREFERRED EMBODIMENTS OF THE INVENTION

In the present PAS, a content of —SX groups is high. Accordingly, the present PAS may react with a large amount of silane compounds. An amount of an extract of the present PAS with methylene chloride is little, which means that there are few oligomers having a relatively low molecular weight. As a result, silane compounds are not wasted. Therefore, the present PAS has large reactivity with silane compounds as well as high mechanical strength obtained by adding only a little amount of the aforesaid agents.

An extract of the present PAS with methylene chloride is in an amount of not more than 0.7% by weight, preferably not more than 0.6% by weight, particularly not more than 0.5% by weight. When the above range is met, there are few oligomers having a relatively low molecular weight in PAS, which condition is preferred. If the amount of the extract exceeds the above upper limit, the effects of the silane compounds to improve mechanical strength such as impact resistance and adhesion are low. The amount of the extract with methylene chloride is determined as follows:

Four grams of PAS powder is added to 80 g of methylene chloride. After Soxhlet extraction for four hours, the whole is cooled to room temperature. A methylene chloride solution after the extraction is placed in a weighing bottle. The Soxhlet extractor used above is washed three times with a total weight of 60 g of methylene chloride. The washing solutions are recovered and put in the above weighing bottle. The whole is heated to about 80° C. to evaporate methylene chloride from the weighing bottle and the residual is weighed.

The present PAS has a content of —SX groups of at least 15 micro moles/g, preferably 18 to 35 micro moles/g, particularly 20 to 30 micro moles/g, wherein X represents an alkali metal or a hydrogen atom. If the content of —SX groups is below the lower limit, the reactivity of PAS with silane compounds is low. Determination of the content of —SX groups is carried out as follows:

PAS powder is dried at 120° C. for 4 hours. Twenty grams of the dried PAS powder are added to 150 g of N-methyl-2-pyrrolidone and stirred vigorously at room temperature for 30 minutes not to leave coagulated powder. The slurry is filtered and washed seven times with each one liter of warm water of 80° C. The resulting filter cake is added to 200 g of pure water to form a slurry again. Then, the pH of the slurry is adjusted to 4.5 by adding 1N hydrochloric acid. The slurry is stirred at 25° C. for 30 minutes, filtered, and washed six times with each one liter of warm water of 80° C. The resulting cake is added to 200 g of pure water to form a slurry again, and titrated with 1N sodium hydroxide for quantitative analysis.

The present PAS has a melt viscosity, $V_6$, is 20 to 15,000 poises, preferably 100 to 10,000 poises, particularly 400 to 5,000 poises. If the melt viscosity is below the lower limit, properties which PAS originally has can not be obtained and the reactivity with silane compound is insufficient. Accordingly, the improvement of mechanical strength, which is one of the purposes of the present invention, and the improvement of adhesion can not be effected. If the melt viscosity exceeds the upper limit, the moldability deteriorates, which is undesirable. In this specification, the melt viscosity, $V_6$, is a viscosity in poise determined after the resin is held for 6 minutes at 300° C. with a load of 20 kgf/cm$^2$ at a ratio of L to D of 10 in a flow tester.

The present PAS mentioned above may be prepared in a process wherein an alkali metal sulfide is reacted with a dihaloaromatic compound in an organic amide solvent, while a part of a gaseous phase in a reactor is condensed by cooling a gaseous phase part of the reactor to return the condensed liquid to a liquid phase, and the polyarylene sulfide (i) thus prepared is washed with an organic solvent and then with water.

Now, the aforesaid PAS (i) can be prepared using a method described in Japanese Patent Application Laid-Open Hei-5-222196, U.S. Pat. No. 5,342,920 and EP 0 547 718 A3.

In this preparation process, the condensed and refluxed liquid has a higher water content compared to the liquid phase bulk, because of difference of the vapor pressures between water and an amide solvent. This reflux with a higher water content creates a layer having a higher water content in the upper part of the reaction mixture. As a result, larger amounts of the remaining alkali metal sulfide (e.g., $Na_2S$), alkali metal halide (e.g., NaCl) and oligomers are contained in this layer. In conventional processes, formed PAS, starting materials such as $Na_2S$ and byproducts are mixed together homogeneously at a high temperature of 230° C. or higher. In such conditions, high molecular weight PAS is not formed and, moreover, even once-formed PAS may be depolymerized to form thiophenol as by-products. In the present process, it is believed that the aforesaid unfavorable phenomena may be avoided, factors which interfere with reaction may be excluded very effectively and high molecular weight PAS may be obtained by actively cooling the gaseous phase part of a reactor and returning a large amount of a water-rich reflux to the upper part of the liquid phase. However, this method should not be restricted by the effects attained only by the aforesaid phenomena, but various effects caused by cooling the gaseous phase part may give high molecular weight PAS.

Addition of water in the middle course of the reaction is unnecessary in this method, unlike in conventional processes, but such addition of water is not precluded. However, some of the advantages of this method will be lost with operations of adding water. Accordingly, it is preferred that the whole water content in a polymerization system is constant in the course of the reaction.

A means of cooling the gaseous phase part of a reactor may be any cooling means known per se, such as external cooling or internal cooling, and preferably comprises an internal coil in which a coolant flows mounted in an upper internal part of the reactor, an external coil in which a coolant flows coiled on an upper outer wall of the reactor, a jacket in which a coolant flows mounted on an upper outer wall of the reactor, a reflux condenser mounted above the reactor or a unit for spraying or blowing water or gas (e.g., air or nitrogen gas) directly to an upper outer wall of the reactor. Any other means may also be applied as long as they have an effect of increasing the amount of a reflux in the reactor. When a surrounding temperature is comparatively low (e.g. normal temperature), proper cooling may be done by removing heat insulating materials from the upper part of a conventional reactor. In the case of the external cooling, a water/amide solvent mixture condensed on the wall of a reactor may fall down along the wall to reach the liquid phase in a reactor. Then, such a water-rich mixture remains in the upper part of the liquid phase and maintains the water content there relatively higher. In the case of the internal cooling, a mixture condensed on the cooling surface may fall down along the surface of a cooling unit or the wall of a reactor and reaches the liquid phase in a reactor, likewise.

Meanwhile, the temperature of a liquid phase bulk is maintained constant at a predetermined value, or controlled in accordance with a predetermined temperature profile. In the case where the temperature is constant, reaction is preferably carried out at a temperature of 230 to 275° C. for 0.1 to 20 hours, more preferably 240 to 265° C. for 1 to 6 hours. It is advantageous to apply a reaction temperature profile having at least two steps in order to obtain higher molecular weight PAS. The first step in the two steps operations is preferably conducted at a temperature of 195 to 240° C. If the temperature is lower, a reaction rate is too late to be practical. If it exceeds 240° C., a reaction rate is too fast to obtain sufficiently high molecular weight PAS and, moreover, rates of side reactions increase noticeably. The first step is preferably ended at a time when a ratio of the remaining dihaloaromatic compound to the charged one in the polymerization system is 1 to 40 mole % and the molecular weight reaches a range of from 3,000 to 20,000. The ratio of 2 to 15 mole % and a molecular weight range of from 5,000 to 15,000 are more preferred. If the ratio exceeds 40 mole %, side reactions such as depolymerization tend to occur in a subsequent second step. If it is less than 1 mole %, it is difficult to obtain high molecular weight PAS finally. Then, the temperature is increased and in a final step, the reaction is preferably carried out at a reaction temperature of 240 to 270° C. for 1 to 10 hours. If the temperature is lower, sufficiently high molecular weight PAS cannot be obtained. If the temperature exceeds 270° C., side reactions such as depolymerization tend to occur and it is difficult to stably prepare high molecular weight product.

In practice, a water content in alkali metal sulfide in the amide type solvent is brought to a predetermined value by dehydration or addition of water at need in an atmosphere of inert gas. The water content is preferably 0.5 to 2.5 moles, more preferably 0.8 to 1.2 moles, per mole of the alkali metal sulfide. If it exceeds 2.5 moles, a reaction rate is low and byproducts such as phenols increase in a filtrate after the completion of the reaction and, further, a polymerization degree is low. If it is less than 0.5 mole, the reaction rate is too fast to obtain sufficiently high molecular weight one, and unfavorable reactions such as side reactions may occur.

In the case of the one step reaction at a constant temperature, the cooling of the gaseous phase part during the reaction should be started, at latest, below 250° C. in the middle course of temperature rise, but preferably started at the beginning of the reaction. In the case of the multi steps reaction, the cooling is preferably started in the middle course of temperature rise after a first step reaction, but more desirably started in a first step reaction. Pressure in a reactor is usually a most proper measure for a degree of a cooling effect. An absolute value of pressure depends upon characteristics of a reactor, stirring conditions, a water content in a reaction system, a mole ratio of a dihaloaromatic compound to alkali metal sulfide and so on. However, a decreased reactor pressure, compared to that in the same reaction conditions except the absence of the cooling, means that the amount of a reflux is increased and the temperature at the gas-liquid interface of a reaction solution is lowered. It is thought that a relative decrease in pressure indicates an extent of separation between a layer with a larger water content and the remaining layer. Accordingly, the cooling is preferably done to such an extent that an internal pressure in a reactor is lower than that of the case where the cooling is not conducted. A person skilled in the art may determine the extent of the cooling, depending upon equipments used and operation conditions.

Organic amide solvents to be used in the invention are those known for the polymerization of PAS and include, for instance, N-methyl pyrrolidone (hereinafter, NMP), N, N-dimethyl formamide, N, N-dimethyl acetamide, N-methyl caprolactam and mixtures thereof with NMP being preferred. All of these have vapor pressure lower than that of water.

Alkali metal sulfides to be used in the invention are also known and include, for instance, lithium sulfide, sodium sulfide, potassium sulfide, rubidium sulfide, cesium sulfide and mixtures thereof. These may be hydrated or in a form of an aqueous solution. Alternatively, hydrosulfides or hydrates corresponding to these may be neutralized with each corresponding hydroxide into the corresponding sulfides and used. Sodium sulfide which is less expensive is preferred.

Dihaloaramatic compounds to be used in the invention may be selected from ones described in Japanese Patent Publication Sho-45-3368. p-Dichlorobenzene is preferred. Further, a small amount (20 mole % or less) of one or more of p-, m-, or o- dihalogenated ones of diphenyl ether, diphenyl sulfone or biphenyl may be used to prepare copolymers, such as m-dichlorobenzene, o-dichlorobenzene, p,p'-dichlorodiphenyl ether, m,p'-dichlorodiphenyl ether, m,m'-dichlorodiphenyl ether, p,p'-dichlorodiphenyl sulfone, m,p'-dichlorodiphenyl sulfone, m,m'-dichlorodiphenyl sulfone, p,p'-dichlorobiphenyl, m,p'-dichlorobiphenyl and m,m'-dichlorobiphenyl.

Polyhalogenated compound, such as 1,3,5-trichlorobenzene and 1,2,4-trichlorobenzene, may also be used preferably in an amount of not more than 5 mole % based on the total amount of p- and m- diharoaromatic compounds, in order to raise the molecular weight of PAS.

In addition, use may be made of other additives such as monohalo compounds as a terminator or modifier in a small amount.

The washing of PAS with an organic solvent is preferably conducted in a manner where a slurry of PAS (i) formed in the aforesaid step is filtered and the resulting filter cake is dispersed in an organic solvent. The aforesaid washing is preferred because origomers having a relatively low molecular weight can be removed well.

In an embodiment of the washing, a slurry of PAS (i) formed in the aforesaid step is filtered to obtain a PAS cake, which is then put into, preferably, a half to ten times weight of an organic solvent and stirred preferably at a temperature of from normal temperature to 180° C., preferably, for 10 minutes to 10 hours, followed by filtration. These stirring and filtration are repeated from one to ten times. The organic solvent to be used in the washing may be an organic amide solvent which is described in the aforesaid explanation of the preparation process of the PAS (i), or xylen. The organic amide solvent is preferred. The organic amide solvent may be same as or different from one used in the preparation process of PAS (i). N-methyl pyrrolidone is particularly preferred as an organic amide solvent.

Subsequent washing with water may be conducted in a conventional manner. However, this is preferably carried out by dispersing into water the filter cake obtained after the washing with the aforesaid organic solvent. For instance, the aforesaid filter cake is put into, preferably, one to five times weight of water, stirred preferably at a temperature of from normal temperature to 90° C., preferably for 5 minutes to 10 hours, and filtered. These stirring and filtration are repeated preferably two to ten times to remove the solvent and by-product salts adhering to the PAS and to thereby complete the washing with water. This manner of water washing realizes more efficient washing with a less amount of water, compared to a washing manner where water is poured to a filter cake. The present inventors have now found that removal of a solvent by drying which has been done in the prior art results in a decreased reactivity of PAS with silane compounds. The removal of a solvent by the water washing according to the invention may make it possible to maintain a high reactivity of PAS with silane compounds.

The PAS thus prepared may be subjected to treatment with acid in the present invention. The treatment with acid is carried out at a temperature of 100° C. or below, preferably from 40 to 80° C. If the temperature exceeds the upper limit, the molecular weight of PAS after the acid treatment is lower, which is undesirable. If the temperature is below 40° C., the remaining inorganic salts crystallize to lower the fluidity of the slurry. This inhibits the process from being conducted in a continuous manner. A concentration of the acid solution used in the acid treatment is preferably 0.01 to 5.0% by weight. A pH of the acid solution used in the acid-treatment is preferably 4.0 to 5.0. With such a concentration and a pH, most of the terminal —SY groups in the PAS treated are converted into terminal —SH groups, wherein Y is an alkali metal, and corrosion of plant equipments may be prevented. A period of time necessary for the acid treatment depends upon a treatment temperature and a concentration of an acid solution and is preferably at least 5 minutes, more preferably at least 10 minutes. With a period of time shorter than this, the terminal —SY groups in PAS are not sufficiently converted into terminal —SH groups. In the acid treatment, use may be made of, for instance, acetic acid, formic acid, oxalic acid, phthalic acid, hydrochloric acid, phosphoric acid, sulfuric acid, sulfurous acid, nitric acid, boric acid, and carbonic acid with acetic acid being preferred. The treatment decreases a content of alkali metals such as sodium as impurities in PAS. Accordingly, it is possible to prevent elution of alkali metals such as sodium and deterioration of electrical insulation in use of products from the PAS.

The present invention relates also to a composition comprising (A) the PAS described above and (B) a silane compound. The silane compound is selected from the group consisting of methacryloxy silane compounds, ureido silane compounds and epoxy silane compounds.

The methacryloxy silane compounds include coupling agents such as gamma-methacryloxypropyltrimethoxysilane, gamma-methacryloxypropyltriethoxysilane, gamma-methacryloxypropylmethyldiethoxysilane and gamma-methacryloxypropylmethyldimethoxysilane.

The ureido silane compound means an alkoxysilane or a halosilane which has one or more ureido groups in a molecule. The ureido silane compounds include coupling agents such as gamma-ureidopropyltriethoxy silane, gamma-ureidopropyltrimethoxy silane and gamma-(2-ureido ethyl)aminopropyltrimethoxysilane.

The epoxy silane compounds include coupling agents such as gamma-glycidoxypropyltrimethoxysilane, gamma-glycidoxypropyltriethoxysilane, beta-(3,4-epoxycyclohexyl)ethyltrimethoxysilane, gamma-glycidoxypropylmethyldiethoxysilane and gamma-glycidoxypropylmethyldimethoxysilane.

The amount of component (B) is at least 0.01 part by weight, preferably at least 0.05 part by weight, particularly at least 0.1 part by weight, and at most 5.0 parts by weight, preferably at most 3.0 parts by weight, particularly at most 2.0 parts by weight, per 100 parts by weight of component (A), PAS. If the amount of component (B) is less than the lower limit, adhesion property of the resin composition with an epoxy resin is low. If it exceeds the upper limit, there may be brought deterioration of processability owing to an increasing viscosity, decrease of mechanical strength, bad appearance of molded articles or increase of costs.

The present composition may further contain component (C), an inorganic filler, as an optional component. The inorganic filler (C) is not restricted to particular ones, and use may be made of, for example, fillers in a powdered and/or scale form or fibrous fillers. The fillers in a powdered and/or scale form include alumina, talc, mica, kaolin, clay, titanium oxide, calcium carbonate, calcium silicate, calcium phosphate, calcium sulfate, magnesium oxide, magnesium phosphate, silicon nitride, glass, hydrotalcite, zirconium oxide, glass beads and carbon black. The fibrous fillers include glass fibers, asbestos fibers, carbon fibers, silica fibers, silica/alumina fibers, potassium titanate fibers and polyaramid fibers. Use may also be made of fillers, for example, ZnO tetrapot, metal salts such as zinc chloride and lead sulfate, oxides such as iron oxides and molybdenum dioxide, and metals such as aluminum and stainless steel. These may be used alone or in combination of two or more of these.

The amount of component (C), inorganic fillers, is at most 400 parts by weight, preferably at most 200 parts by weight, particularly at most 100 parts by weight. If the amount of component (C) exceeds the upper limit, processability deteriorates. In order to enhance mechanical strength, it is preferred that the composition contains an amount of not less than 0.01 parts by weight of component (C).

In addition to the aforesaid components, the present composition may further contain a known additives and fillers, such as antioxidants, UV absorbants, releasing agents, heat stabilizers, lubricants, and colorants, if needed.

Means for mixing the aforesaid components with the PAS are not restricted and use may be made of any conventional means, such as mixers, e.g., Henschel mixer.

The present PAS resin composition is usually melt kneaded on a single or twin-screw extruder, pelletized, and then; molded into a desired shape in, for instance, injection molding or compression molding. However, A processing manner is not restricted to these. Use may be made of a method in which some of the required components are mixed in a form of a master batch with the other components and molded.

The present PAS resin composition has good adhesion to thermoplastic resins such as epoxy resins and is, therefore, useful for sealing electric and electronic parts.

The present inventors have also found that when an epoxy type silane coupling agent is used as component (B) in the aforesaid PAS resin composition, mechanical strength such as toughness is very high at a weld part of a molded article obtained by injection molding the aforesaid PAS resin composition and the molded article is less expensive. Accordingly, the present invention relates also to a molded article having a weld part.

If the amount of component (B) is less than the aforesaid lower limit, mechanical strength such as toughness is low at a weld part of the article. Meanwhile it exceeds the upper limit, there may be brought deterioration of processability owing to an increasing viscosity, decrease of mechanical strength, bad appearance of the article or increase of costs.

In the present invention, a weld part is a portion formed by injection molding where the forefront of two or more resin flows merge in a mold cavity. The weld part may often appear in the case where a molded article has a cavity part, or in the case where wall thickness changes and it is impossible to let a molding material flow unidirectionally from a thick wall part to a thin wall part. It is absolutely impossible to avoid appearance of a weld part in the case where two or more gates are used, or in the case of molding an article in the form of ring, disc or rectangular pillar even with only one gate. The weld part may be generally identified by appearances of linear unevenness in color on the surface of an article or of a pattern caused by joining resin flows.

The present molded article is preferably obtained by injecting the composition into a mold cavity through at least two gates per one molded article. In the product, there is necessarily formed an interface where two or more resin flows corresponding to the number of the gates join. The area of the interface is wide. Accordingly, in the prior art, there is a remarkable drawback of defect in strength in the weld part, which is fatal in practice. The present invention is effective to improve the remarkable defect of the weld part which appears in the product obtained by injection molding through two or more gates.

The articles having the aforesaid weld part include various functional parts such as electronic parts, e.g. connectors, coil bobbins, printed wiring boards, and chassis for electronic parts; electric heating parts, e.g. lamp sockets, dryer grills, thermostat bases, and thermostat cases; motor parts, e.g. brush holders, bearings, and motor cases; precision mechanical equipments, e.g. claws for copying machines, diaphragms for cameras, clock cases, and matrix plates for clocks; automobile parts, e.g. exhaust gas circulation valves, carburetors, alternator terminal blocks, tachometer housings, and battery housings; or chemical equipment parts, e.g. cleansing flames, insulators, pipe brackets, pump casings, and tower fillers, with the connectors being preferred. Although the aforesaid products do not always have a weld part, it is difficult in view of their functionality to avoid the formation of a weld part. The products having a weld part are not restricted to those described above which are only examples.

The present invention will be further elucidated with reference to the following Examples, which are not intended to limit the invention.

EXAMPLES

In the Examples, properties were determined as follows:

A melt viscosity, $V_6$, was measured using a flow tester, CFT-500C, from Shimazu Seisakusho Co.

Reactivity with an epoxy type silane coupling agent was evaluated by thickening ratio, $\alpha$. The thickening ratio, $\alpha$, is defined as follows $$\alpha(\%) = \{(V_S - V_B)/V_B\} \times 100$$

wherein $V_B$ stands for a melt viscosity of PAS, $V_6$, before reacting with an epoxy type silane coupling agent, and $V_S$ stands for a melt viscosity of PAS, $V_6$, after reacting with the epoxy type silane coupling agent. The melt viscosity, $V_6$, in poise was measured after held for 6 minutes in conditions of a temperature of 300° C., a load of 20 kgf/cm$^2$ and L/D= 10/1. The melt viscosity of PAS after the reaction, $V_S$, was measured by blending PAS with an epoxy type silane coupling agent in an amount indicated in Table 1 and placing the PAS in the aforesaid flow tester.

As an epoxy type silane coupling agent, use was made of gamma-glycidoxypropyltrimethoxysilane, trade mark A187, ex Nippon Uniker Co., provided that in the case marked "*1" in Table 1, use was made of beta-(3,4-epoxycyclohexyl)ethyltrimethoxysilane, trade mark A186, ex Nippon Uniker Co.

Izod impact resistance was measured in accordance with ASTM D256.

Tensile strength and elongation at break were measured in accordance with ASTM D638.

Example 1

In a 150 liters autoclave were charged 19.286 kg of flaky sodium sulfide (Na$_2$S content of 61.0% by weight) and 45.0 kg of N-methyl-2-pyrrolidone (hereinafter referred to as NMP). The temperature was elevated to 204° C. in a flow of nitrogen under stirring to distill off 4.157 kg of water(the content of water remained being 1.21 moles per mole of sodium sulfide). The autoclave was then sealed and cooled to 180° C. in which 22.05 kg of para-dichlorobenzene (hereinafter referred to as p-DCB) and 18.0 kg of NMP were charged. After pressurizing it to 1 kg/cm²G (i.e., gauge pressure) with nitrogen gas at a liquid temperature of 150° C., the temperature started to be raised. Stirring was continued at a liquid temperature of 215° C. for five hours, while a coolant of 80° C. was passed through a coil which was wound on the upper part of the outside of the autoclave to cool it. Then, the liquid temperature was raised and stirring was continued at a liquid temperature of 260° C. for three hours, while reaction proceeded. Subsequently, the temperature was lowered and, at the same time, the cooling of the upper part of the autoclave was stopped. During the cooling of the upper part of the autoclave, the liquid temperature was maintained constant so as not to lower.

The polymerization slurry was then cooled to room temperature to obtain slurry, S-1.

After filtering a part (4 kg) of the polymerization slurry (S-1), the filter cake obtained was put into 2 kg of fresh NMP. Subsequently, stirring was continued at 120° C. for thirty minutes and then the slurry was filtered to remove NMP. The filter cake was then poured into warm water of about 80° C. of which weight was about twice the weight of the filter cake. After stirring it sufficiently for about thirty minutes, it was filtered. This water washing and filtration treatment was repeated seven times. The resultant filter cake was then dried at 120° C. for six hours in a hot air ventilation dryer to obtain a white powdery PPS. The $V_B$ of the PPS obtained (P-1) was 1,250 poises.

Example 2

After filtering another part (4 kg) of the polymerization slurry (S-1) obtained in Example 1, the filter cake obtained was put into 2 kg of fresh NMP to form a slurry. Subsequently, stirring was continued at 120° C. for thirty minutes and then the slurry was filtered to remove NMP. The filter cake was then poured into warm water of about 80° C. of which weight was about twice the weight of the filter cake. After stirring it sufficiently for about thirty minutes, it was filtered. This water washing and filtration treatment was repeated twice. After the resultant filter cake was put into pure water to form a slurry, acetic acid was added to the slurry to adjust a pH to 5.0, after which stirring was continued for 15 minutes to complete acid treatment. After the acid treatment, the water washing was repeated four times. The resultant filter cake was then dried at 120° C. for six hours in a hot air ventilation dryer to obtain a white powdery PPS. The $V_B$ of the PPS obtained (P-2) was 1,110 poises.

Comparison Example 1

The procedures in Example 1 were repeated, except that the washing with fresh NMP was not carried out. The $V_B$ of the PPS obtained (P-3) was 1,080 poises.

Comparison Example 2

After filtering another part (4 kg) of the polymerization slurry (S-1) obtained in Example 1, the filter cake was dried on an evaporator under a reduced pressure of 10 torr in an oil bath at 200° C. for about one hour until NMP did not distill any more. The cake was then cooled and put into warm water of about 80° C. of which weight was about twice the weight of the filter cake. This water washing and filtration treatment was repeated seven times. The resultant filter cake was then dried at 120° C. for six hours in a hot air ventilation dryer to obtain a liver brown powdery PPS. The $V_B$ of the PPS obtained (P-4) was 1,380 poises.

Comparison Example 3

The procedures in Example 1 were repeated, except that 8.0 kg of sodium acetate trihydrate was added as a polymerization assistant to the reaction system, 22.612 kg of p-DCB were charged in the autoclave and the cooling on the upper part of the autoclave was not conducted. The VB of the PPS obtained (P-5) was 1,470 poises.

Properties of each PPS prepared in the aforesaid Examples and Comparison Examples are as shown in Table 1. For P-2 from Example 2, a thickening ratio was determined with various amounts and types of epoxy type silane coupling agents.

TABLE 1

| Type of PBS | P-1 | P-2 | P-2 | P-2 | P-3 | P-4 | P-5 |
|---|---|---|---|---|---|---|---|
| Extract with Methylene Chloride, wt. % | 0.47 | 0.51 | 0.51 | 0.51 | 1.22 | 1.15 | 0.48 |
| -SX groups, μmol/g | 21 | 22 | 22 | 22 | 24 | 23 | 12 |
| Melt Viscosity, $V_6$ | 1250 | 1110 | 1110 | 1110 | 1080 | 1380 | 1470 |
| Thickening ratio, α, % | 233 | 308 | 678 | 359 | 51 | 47 | 63 |
| PPS, part by weight | 100 | 100 | 100 | 100 | 100 | 100 | 100 |
| Epoxy Type Silane Coupling Agent, part by weight | 0.5 | 0.5 | 0.8 | 0.5*[1] | 0.5 | 0.5 | 0.5 |

*[1]β-(3,4-epoxycyclohexyl)ethyltrimethoxysilane was used as an epoxy type silane coupling agent.

P-1 and P-2 are examples of the PPS of the invention. When 0.5 part by weight of the epoxy type silane coupling agent was added, every PPS exhibited a high thickening ratio. For P-2, when the amount of the epoxy type silane coupling agent was increased to 0.8 part by weight, PPS exhibited a higher thickening ratio. Thus, it was found that the present PAS has high reactivity with an epoxy type silane coupling agent. For P-2, a thickening ratio was measured with another epoxy type silane coupling agent to find that a high thickening ratio was attained in both cases.

Meanwhile, P-3 is a PPS which was prepared without the washing with fresh NMP. The amount of the extract with methylene chloride was high and the thickening ratio was remarkably low. P-4 is a PPS which was prepared in a manner that the washing with fresh NMP was not carried out and, after NMP was distilled off, water washing was carried out. The amount of the extract with methylene chloride was high and the thickening ratio was remarkably low. P-5 is a PPS which was prepared without the cooling of the upper part of the autoclave. A content of —SX groups of the PPS obtained was low and a thickening ratio was remarkably low.

Examples 3 to 6 and Comparison Examples 4 to 7

Each PPS, glass fiber, trade mark CS 3J-961S, ex Nitto Boseki Co., and an epoxy type silane coupling agent were mixed in amounts in part by weight shown in Table 2, and then kneaded and extruded by an extruder with a diameter of 20 mm with twin screws rotating in opposite directions at a barrel setting temperature of 320° C. and pelletized. The pellets obtained were injection molded at a cylinder temperature of 320° C. and a mold temperature of 130° C. to obtain a test piece which was then subjected to the evaluation tests.

The epoxy type silane coupling agent used in Examples 3 to 5 and Comparison Examples 4 to 6 was gamma-glycidoxypropyltrimethoxysilane, trade mark A187, ex Nippon Uniker Co. and the one used in Example 6 was beta-(3,4-epoxycyclohexyl)ethyltrimethoxysilane, trade mark A186, ex Nippon Uniker Co.

The results thus obtained are as shown in Table 2.

raised to 250° C. and stirring was continued at that temperature for three hours, while reaction proceeded. Subsequently, the temperature was lowered and, at the same time, the cooling of the upper part of the autoclave was stopped. During the cooling of the upper part of the autoclave, the liquid temperature was maintained constant so as not to lower.

After filtering the resultant polymerization slurry, the filter cake obtained was put into fresh NMP to form a slurry of a slurry concentration of 15% by weight. Subsequently, stirring was continued at 120° C. for thirty minutes and then the slurry was filtered to remove NMP. The filter cake was then poured into warm water of about 80° C. of which weight was about twice the weight of the filter cake. After stirred sufficiently for about thirty-minutes, it was filtered. This water washing and filtration treatment was repeated seven times. The resultant filter cake was then dried at 120° C. for about five hours in a hot air ventilation dryer to obtain a white powdery PPS. The $V_6$ of the PPS obtained (P-6) was 860 poises.

TABLE 2

|  | Example | | | | Comparison Example | | | |
| --- | --- | --- | --- | --- | --- | --- | --- | --- |
|  | 3 | 4 | 5 | 6 | 4 | 5 | 6 | 7 |
| Type of PPS | P-1 | P-2 | P-1 | P-2 | P-3 | P-1 | P-5 | P-1 |
| PPS, part by weight | 60 | 60 | 60 | 60 | 60 | 60 | 60 | 60 |
| Glass Fiber, part by weight | 40 | 40 | 40 | 40 | 40 | 40 | 40 | 40 |
| Epoxy Type Silane Coupling Agent, part by weight | 0.5 | 0.5 | 0.8 | 0.5 | 0.5 | 0.5 | 0.5 | 0 |
| Impact Strengh, (kgf · cm/cm | 65 | 70 | 72 | 71 | 50 | 48 | 52 | 47 |
| Tensile Strength, (kgf/cm$^2$) | 1920 | 1980 | 1990 | 1970 | 1730 | 1750 | 1700 | 1680 |
| Tensile Elongation at break, % | 2.2 | 2.4 | 2.5 | 2.5 | 1.3 | 1.4 | 1.5 | 1.2 |

The compositions in Examples 3 to 6 are in the scope of the present invention. The molded articles therefrom exhibited high impact strength, tensile strength and tensil elongation at break.

Meanwhile, the resin compositions in Comparison Examples 4 to 6 are those in which the PPS prepared in Comparison Examples 1 to 3 were used, respectively. The molded articles therefrom exhibited poorer impact strength, tensile strength and tensil elongation at break than those in Examples 3 to 6. The resin composition in Comparison Example 7 is one in which the present PPS (P-1) was used with no epoxy type silane coupling agent being used. The impact strength, tensile strength and tensil elongation at break thereof were poorer than those in Example 3.

Synthetic Example 1

In a 150 liters autoclave were charged 19.349 kg of flaky sodium sulfide (Na$_2$S content of 60.5% by weight) and 45.0 kg of NMP. The temperature was elevated to 204° C. in a flow of nitrogen under stirring to distill off 4.838 kg of water. The autoclave was then sealed and cooled to 180° C., in which 22.273 kg of p-DCB and 18.0 kg of NMP were charged. After pressurizing it to 1 kg/cm$^2$G (i.e., gauge pressure) with nitrogen gas at a liquid temperature of 150° C., the temperature started to be raised. Stirring was continued at a liquid temperature of 215° C. for five hours, while it was carried out to spray water by a water-spraying apparatus which was set on the upper part of the outside of the autoclave to cool it. Then, the liquid temperature was

Synthetic Example 2

After filtering a polymerization slurry obtained as in Synthetic Example 1, the resultant filter cake was put into fresh NMP to form a slurry of a slurry concentration of 15% by weight. Subsequently, stirring was continued at 120° C. for thirty minutes and then the slurry was filtered to remove NMP. The filter cake was poured into warm water of about 80° C. of which weight was about twice the weight of the filter cake. After stirred sufficiently for about thirty minutes, it was filtered. This water washing and filtration treatment was repeated twice. After the resultant filter cake was put into pure water to form a slurry, acetic acid was added to the slurry to adjust a pH to 5.0, after which (stirring was continued at a temperature of 50° C. for 30 minutes to complete acid treatment. After the acid treatment, the slurry was filtered. Procedure consisting of adding pure water to the filter cake, stirring and filtering the slurry were repeated four times. The resultant filter cake was then dried at 120° C. for about five hours in a hot air ventilation dryer to obtain a white powdery PPS. The $V_6$ of the PPS obtained (P-7) was 790 poises.

Synthetic Example 3 (For Comparison)

The procedures in Synthetic Example 1 were repeated, except that the washing with fresh NMP was not carried out. The $V_6$ of the PPS obtained (P-8) was 740 poises.

Synthetic Example 4 (For Comparison)

After filtering a polymerization slurry obtained as in Synthetic Example 1, the filter cake was dried on an evaporator under a reduced pressure of 10 torr in an oil bath at 200° C. for about one hour until NMP was not distilled off any more. The cake was then cooled and put into warm water of about 80° C. of which weight was about twice the weight of the filter cake. After stirred sufficiently for about 30 minutes, it was filtered. This water washing and filtration treatment was repeated seven times. The resultant filter cake was then dried at 120° C. for five hours in a hot air ventilation dryer to obtain a liver brown powdery product. The $V_6$ of the PPS obtained (P-9) was 1,030 poises.

Synthetic Example 5 (For Comparison)

The procedures in Synthetic Example 1 were repeated, except that 8.0 kg of sodium acetate trihydrate were added as a polymerization assistant to the reaction system and 22.750 kg of p-DCB were charged in an autoclave and the cooling on the upper part of the autoclave was not conducted. The $V_6$ of the PPS obtained (P-10) was 1,110 poises.

Examples 7 to 11 and Comparison Examples 8 to 12

Each PPS, a methacryloxysilane compound and a glass fiber, trade mark CS 3J-961S, ex Nitto Boseki Co., were mixed in the amounts in part by weight indicated in Table 3 in a Henschel mixer for five minutes to obtain a homogeneous mixture, and then melt kneaded and extruded by an extruder with a diameter of 20 mm with twin screws rotating in opposite directions at a barrel setting temperature of 300° C. and at 400 rpm and then pelletized. The pellets obtained were molded on an injection molding machine which was set to a cylinder temperature of 320° C. and a mold temperature of 130° C. to obtain test pieces in accordance with JIS K6850. The test pieces were bonded to each other using an epoxy resin type adhesive, ex Nagase Chiba Co., a ratio of a primary agent, trade mark XNR3101, to a curing agent, trade mark XNH3101, of 100 to 33.3 in parts by weight, in curing conditions of 90° C. for thirty minutes. They were subjected to a tensile test in conditions of a tensile rate of 5 mm/minute and a distance between chucks of 130 mm to measure adhesion strength.

In these Examples and Comparison Examples, use was made of Y-methacryloxypropyltrimethoxysilane, trade mark A174, ex Nippon Uniker, as a methacryloxysilane compound.

The results are as shown in Table 3.

The composition of Example 7, which was an example of the present resin composition, had good adhesion strength. In the composition of Example 8, use was made of PPS prepared by subjecting the PPS (A) used in Example 7 to acid treatment. The composition exhibited good adhesion strength as in Example 7. The compositions of Examples 9 to 11 were same as that in Example 8, except that the amount of methacryloxysilane compound (B) was increased within the range of the present invention. It was found that the larger the amount of (B) was, the higher the adhesion strength was.

Meanwhile, in Comparison Examples 8 to 10, use was made of PPS of which extract amount with methylene chloride exceeded the range of the present invention. Adhesion strength in Comparison Example 8 and adhesion strengths in Comparison Examples 9 and 10 were remarkably lower than those in Example 7 and in Example 9, respectively. In Comparison Example 11, use was made of PPS in which the amount of —SX groups was below the range of the present invention. Adhesion strength was again remarkably low, compared to Example 9. The composition of Comparison Example 12 was same as that in Example 7, except that methacryloxysilane compound (B) was not blended in the composition. The composition without (B) exhibited remarkably low adhesion strength.

Synthetic Example 6

In a 150 liters autoclave were charged 19.285 kg of flaky sodium sulfide ($Na_2S$ content of 60.7% by weight) and 45.0 kg of NMP. The temperature was elevated to 204° C. in a flow of nitrogen under stirring to distill off 4.757 kg of water. The autoclave was then sealed and cooled to 180° C., in which 22.273 kg of p-DCB and 18.0 kg of NMP were charged. After pressurizing it to 1 kg/cm$^2$G (i.e., gauge pressure) with nitrogen gas at a liquid temperature of 150° C., the temperature started to be raised. Stirring was continued at a liquid temperature of 220° C. for five hours, while it was carried out to spray water by a water-spraying apparatus which was set on the upper part of the outside of the autoclave to cool it. Then, the liquid temperature was raised to 250° C. and stirring was continued at that temperature for three hours, while reaction proceeded. Subsequently, the temperature was lowered and, at the same time, the cooling of the upper part of the autoclave was stopped. During the cooling of the upper part of the autoclave, the liquid temperature was maintained constant so as not to lower.

TABLE 3

|  | Example | | | | | Comparison Example | | | | |
| --- | --- | --- | --- | --- | --- | --- | --- | --- | --- | --- |
|  | 7 | 8 | 9 | 10 | 11 | 8 | 9 | 10 | 11 | 12 |
| Type of PPS | P-6 | P-7 | P-7 | P-7 | P-7 | P-8 | P-8 | P-9 | P-10 | P-6 |
| Extract with Methylene Chloride, wt. % | 0.47 | 0.50 | 0.50 | 0.50 | 0.50 | 1.13 | 1.13 | 1.06 | 0.53 | 0.47 |
| -SX groups, μmol/g | 22 | 23 | 23 | 23 | 23 | 25 | 25 | 24 | 12 | 22 |
| Melt Viscosity, $V_6$, poise | 860 | 790 | 790 | 790 | 790 | 740 | 740 | 1030 | 1110 | 860 |
| Resin Composition |  |  |  |  |  |  |  |  |  |  |
| PPS, part by weight | 100 | 100 | 100 | 100 | 100 | 100 | 100 | 100 | 100 | 100 |
| Methacryloxysialne Compound, part by weight | 0.4 | 0.4 | 0.7 | 1.0 | 2.0 | 0.4 | 0.7 | 0.7 | 0.7 | 0 |
| Glass fiber, part by weight | 67 | 67 | 67 | 67 | 67 | 67 | 67 | 67 | 67 | 67 |
| Adhesion Strength, (kgf/cm$^2$) | 63.0 | 66.0 | 72.0 | 76.0 | 83.0 | 47.0 | 51.0 | 49.0 | 53.0 | 47.0 |

After filtering the resultant polymerization slurry, the filter cake obtained was put into fresh NMP to form a slurry of a slurry concentration of 15% by weight. Subsequently, stirring was continued at 120° C. for thirty minutes and then the slurry was filtered to remove NMP. The filter cake was then poured into warm water of about 80° C. of which weight was about twice the weight of the filter cake. After stirred sufficiently for about thirty minutes, it was filtered. This water washing and filtration treatment was repeated seven times. The resultant filter cake was then dried at 120° C. for about five hours in a hot air ventilation dryer to obtain a white powdery PPS. The $V_6$ of the PPS obtained (P-11) was 840 poises.

Synthetic Example 7

After filtering a polymerization slurry obtained as in Synthetic Example 6, the resultant filter cake was put into fresh NMP to form a slurry of a slurry concentration of 15% by weight. Subsequently, stirring was continued at 120° C. for thirty minutes and then the slurry was filtered to remove NMP. The filter cake was poured into warm water of about 80° C. of which weight was about twice the weight of the filter cake. After stirred sufficiently for about thirty minutes, it was filtered. This water washing and filtration treatment was repeated twice. After the resultant filter cake was put into pure water to form a slurry, acetic acid was added to the slurry to adjust a pH to 5.0, after which stirring was continued at a temperature of 50° C. for 30 minutes to complete acid treatment. After the acid treatment, the slurry was filtered. Procedure consisting of adding pure water to the filter cake, stirring and filtering the slurry were repeated four times. The resultant filter cake was then dried at 120° C. for about five hours in a hot air ventilation dryer to obtain a white powdery PPS. The $V_6$ of the PPS obtained (P-12) was 780 poises.

Synthetic Example 8 (For Comparison)

The procedures in Synthetic Example 6 were repeated, except that the washing with fresh NMP was not carried out. The $V_6$ of the PPS obtained (P-13) was 730 poises.

Synthetic Example 9 (For Comparison)

After filtering the polymerization slurry obtained as in Synthetic Example 6, the filter cake was dried on an evaporator under a reduced pressure of 10 torr in an oil bath at 200° C. for about one hour until NMP was not distilled off any more. The cake was then cooled and put into warm water of about 80° C. of which weight was about twice the weight of the filter cake. After stirred sufficiently for about 30 minutes, it was filtered. This water washing and filtration treatment was repeated seven times. The resultant filter cake was then dried at 120° C. for five hours in a hot air ventilation dryer to obtain a liver brown powdery product. The $V_6$ of the PPS obtained (P-14) was 990 poises.

Synthetic Example 10 (For Comparison)

The procedures in Synthetic Example 6 were repeated, except that 8.0 kg of sodium acetate trihydrate were added as a polymerization assistant to the reaction system and 22.750 kg of p-DCB were charged in the autoclave and the cooling on the upper part of the autoclave was not conducted. The $V_6$ of the PPS obtained (P-15) was 1,080 poises.

Examples 12 to 16 and Comparison Examples 13 to 17

Each PPS, an ureidosilane compound and a glass fiber, trade mark CS 3J-961S, ex Nitto Boseki Co., were mixed in the amounts in part by weight indicated in Table 4 in a Henschel mixer for five minutes to obtain a homogeneous mixture, and then melt kneaded and extruded by an extruder with a diameter of 20 mm with twin screws rotating in opposite directions at a barrel setting temperature of 300° C. and at 400 rpm and then pelletized. The pellets obtained were molded on a injection molding machine which was set to a cylinder temperature of 320° C. and a mold temperature of 130° C. to obtain test pieces in accordance with JIS-K6850. The test pieces were bonded to each other using an epoxy resin type adhesive, ex Nagase Chiba Co., a ratio of a primary agent, trade mark XNR3101, to a curing agent, trade mark XNH3101, of 100 to 33.3 in parts by weight, in curing conditions of 90° C. for thirty minutes. They were subjected to a tensile test in conditions of a tensile rate of 5 mm/minute and a distance between chucks of 130 mm to measure adhesion strength.

In these Examples and Comparison Examples, use was made of Y-ureidopropyltriethoxysilane, trade mark A1160, ex Nippon Uniker, as a ureidosilane compound.

The results are as shown in Table 4.

TABLE 4

|  | Example | | | | | Comparison Example | | | | |
| --- | --- | --- | --- | --- | --- | --- | --- | --- | --- | --- |
|  | 12 | 13 | 14 | 15 | 16 | 13 | 14 | 15 | 16 | 17 |
| PPS |  |  |  |  |  |  |  |  |  |  |
| Type of PPS | P-11 | P-12 | P-12 | P-12 | P-12 | P-13 | P-13 | P-14 | P-15 | P-11 |
| Extract with Methylene Chloride, wt. % | 0.51 | 0.52 | 0.52 | 0.52 | 0.52 | 1.15 | 1.15 | 1.09 | 0.55 | 0.51 |
| -SX groups, $\mu$mol/g | 22 | 23 | 23 | 23 | 23 | 25 | 25 | 24 | 12 | 22 |
| Melt Viscosity, $V_6$, poise | 840 | 780 | 780 | 780 | 780 | 730 | 730 | 990 | 1080 | 840 |
| Resin Composition |  |  |  |  |  |  |  |  |  |  |
| PPS, part by weight | 100 | 100 | 100 | 100 | 100 | 100 | 100 | 100 | 100 | 100 |
| Ureido Silane Compound, part by weight | 0.4 | 0.4 | 0.7 | 1.0 | 2.0 | 0.4 | 0.7 | 0.7 | 0.7 | 0 |
| Glass fiber, part by weight | 67 | 67 | 67 | 67 | 67 | 67 | 67 | 67 | 67 | 67 |
| Adhesion Strength, (kgf/cm$^2$) | 65.0 | 68.0 | 76.0 | 79.0 | 85.0 | 48.0 | 53.0 | 49.0 | 52.0 | 48.0 |

The composition of Example 12, which was an example of the present resin composition, had good adhesion strength. In the composition of Example 13, use was made of PPS prepared by subjecting the PPS (A) used in Example 12 to acid treatment. The composition exhibited good adhesion strength as in Example 12. The compositions of Examples 14 to 16 were same as that in Example 13, except that the amount of ureidosilane compound (B) was increased within the range of the present invention. It was found that the larger the amount of (B) was, the higher the adhesion strength was.

Meanwhile, in Comparison Examples 13 to 15, use was made of PPS of which extract amount with methylene chloride exceeded the range of the present invention. Adhesion strength in Comparison Example 13 and adhesion strengths in Comparison Examples 14 and 15 were remarkably lower than those in Example 12 and in Example 14, respectively. In Comparison Example 16, use was made of PPS in which the amount of —SX groups was below the range of the present invention. Adhesion strength was again remarkably low, compared to Example 14. The composition of Comparison Example 17 was same as that in Example 12, except that ureidosilane compound (B) was not blended in the composition. The composition without (B) exhibited remarkably low adhesion strength.

Synthetic Example 11

In a 150 liters autoclave were charged 19.285 kg of flaky sodium sulfide ($Na_2S$ content of 60.7% by weight) and 45.0 kg of NMP. The temperature was elevated to 204° C. in a flow of nitrogen under stirring to distill off 4.892 kg of water. The autoclave was then sealed and cooled to 180° C., in which 22.161 kg of p-DCB and 18.0 kg of NMP were charged. After pressurizing it to 1 $kg/cm^2G$ (i.e., gauge pressure) with nitrogen gas at a liquid temperature of 150° C., the temperature started to be raised. Stirring was continued at a liquid temperature of 220° C. for five hours, while it was carried out to spray water by a water-spraying apparatus which was set on the upper part of the outside of the autoclave to cool it. Then, the liquid temperature was raised to 255° C. and stirring was continued at that temperature for two hours, while reaction proceeded. Subsequently, the temperature was lowered and, at the same time, the cooling of the upper part of the autoclave was stopped. During the cooling of the upper part of the autoclave, the liquid temperature was maintained constant so as not to lower.

After filtering the resultant polymerization slurry, the filter cake obtained was put into fresh NMP to form a slurry of a slurry concentration of 15% by weight. Subsequently, stirring was continued at 120° C. for thirty minutes and then the slurry was filtered to remove NMP. The filter cake was poured into warm water of about 80° C. of which weight was about twice the weight of the filter cake. After stirred sufficiently for about thirty minutes, it was filtered. This water washing and filtration treatment was repeated seven times. The resultant filter cake was then dried at 120° C. for about five hours in a hot air ventilation dryer to obtain a white powdery PPS. The $V_6$ of the PPS obtained (P-16) was 970 poises.

Synthetic Example 12

After filtering a polymerization slurry obtained as in Synthetic Example 11, the resultant filter cake was put into fresh NMP to form a slurry of a slurry concentration of 15% by weight. Subsequently, stirring was continued at 120° C. for thirty-minutes and then the slurry was filtered to remove NMP. The filter cake was poured into warm water of about 80° C. of which weight was about twice the weight of the filter cake. After stirred sufficiently for about thirty minutes, it was filtered. This water washing and filtration treatment was repeated twice. After the resultant filter cake was put into pure water to form a slurry, acetic acid was added to the slurry to adjust a pH to 5.0, after which stirring was continued at a temperature of 50° C. for 30 minutes to complete acid treatment. After the acid treatment, it was filtered. Procedures consisting of adding pure water to the filter cake, stirring and filtering the slurry were repeated four times. The resultant filter cake was then dried at 120° C. for about five hours in a hot air ventilation dryer to obtain a white powdery PPS. The $V_6$ of the PPS obtained (P-17) was 880 poises.

Synthetic Example 13 (For Comparison)

The procedures in Synthetic Example 11 were repeated, except that the washing with fresh NMP was not carried out. The V6 of the PPS obtained (P-18) was 820 poises.

Synthetic Example 14 (For Comparison)

After filtering a polymerization slurry obtained as in Synthetic Example 11, the filter cake was dried on an evaporator under a reduced pressure of 10 torr in an oil bath at 200° C. for about one hour until NMP was not distilled off any more. The cake was then cooled and put into warm water of about 80° C. of which weight was about twice the weight of the filter cake. After stirred sufficiently for about 30 minutes, it was filtered. This water washing and filtration treatment was repeated seven times. The resultant filter cake was then dried at 120° C. for five hours in a hot air ventilation dryer to obtain a liver brown powdery product. The $V_6$ of the PPS obtained (P-19) was 1,020 poises.

Synthetic Example 15 (PPS For Comparison, Prepared According to a Method of Japanese Patent Application Laid-Open No. Sho-61-7332/1986)

(1) Former step of polymerization

In a 150 liters autoclave were charged 19.028 kg of flaky sodium sulfide ($Na_2S$ content of 60.7% by weight) and 45.0 kg of NMP. The temperature was elevated to 204° C. in a flow of nitrogen under stirring to distill off 4.497 kg of water. A content of water remained was 1.10 moles per mole of sodium sulfide. The autoclave was then sealed and cooled to 180° C., in which 22.200 kg of p-DCB and 18.0 kg of NMP were charged. Polymerization was conducted at 210° C. for ten hours to obtain a slurry (S-2) from the former step of polymerization.

The amount of p-DCB remained in the slurry was determined on a gas chromatograph. A conversion of p-DCB was obtained according to the following formula: (conversion of p-DCB)=[(amount of p-DCB charged in mole)−(amount of p-DCB remained in mole)]×100/(amount of p-DCB charged in mole) The conversion was 95.0%.

A hundred grams of the slurry were sampled and filtered under reduced pressure to remove liquid components. Subsequently, solids were dispersed into about 1 kg of demineralized water, and filtered again under reduced pressure to wash the resultant PPS. These procedures was repeated three times. The PPS was dried at 100° C. for 2 hours under the atmosphere to obtain PPS powder. A melt viscosity of the PPS was measured at 310° C. It was 60 poises, reduced at a shear rate of 200 $second^{-1}$.

(2) Latter step of polymerization 550 grams of slurry (S-2) were charged in one liter autoclave, to which 50.4 grams of water were added, which gave a whole content of water of 4.60 moles per mole of sodium sulfide. The temperature was elevated to 250° C. under nitrogen atmosphere and polymerization was conducted for three hours. The conversion of p-DCB was 99.0%. After the slurry was cooled, pearl-like PPS was sieved to be separated from NMP and PPS origomers. After the pearl-like PPS was then washed with demineralized water repeatedly, it was dried at 100° C. for three hours in a hot air ventilation dryer to obtain a white pearl-like PPS. The $V_6$ of the PPS obtained (P-20) was 1,440 poises. The melt viscosity measured at a shear rate of 200 second$^{-1}$ and 310° C. was about 1,100 poises.

Examples 17 to 21 and Comparison Examples 18 to 21

Each PPS, an epoxy type silane coupling agent and a glass fiber, trade mark CS 3J-961S, ex Nitto Boseki Co., were mixed in the amounts in part by weight indicated in Table 5 in a Henschel mixer for five minutes to obtain a homogeneous mixture, and melt kneaded and extruded by an extruder with a diameter of 20 mm with twin screws rotating in opposite directions at a barrel setting temperature of 300° C. and at 400 rpm and then pelletized. The pellets obtained were molded into plates of a width of 80 mm, a length of 180 mm and a thickness of 3 mm, by an injection molding machine which was set to a cylinder temperature of 320° C. and a mold temperature of 130° C., using a mold having film gates on either side. The molded article thus obtained was cut into strips having a width of 20 mm. Tensile strength and Izod impact strength thereof were measured according to ASTM D638 ASTM D256, respectively, to evaluate strength at a weld part.

As an epoxy type silane coupling agent, use was made of Υ-glycidoxypropyltrimethoxysilane, trade mark A187, ex Nippon Uniker, in Examples 17 to 20 and Comparison Examples 18 to 21, and β-(3,4-epoxycyclohexyl) ethyltrimethoxysilane, trade mark A186, ex Nippon Uniker, in Example 21.

The results are as shown in Table 5.

The molded article of Example 17, which was an example of the present resin molded article, had good strength at a weld part. In the molded article of Example 18, use was made of PPS prepared by subjecting PPS (A) used in Example 17 to acid treatment. It exhibited good strength at a weld part as in Example 17. The molded articles of Examples 19 and 20 were same as that of Example 18, except that the amount of epoxy silane coupling agent (B) was increased within the range of the present invention. It was found that the larger the amount of (B) was, the higher the strength at a weld part was. In Example 21, the type of (B) in Example 18 was changed. With β-(3,4-epoxycyclohexyl)ethyltrimethoxysilane as an epoxy type silane coupling agent, strength at a weld part was higher.

Meanwhile, in Comparison Examples 18 and 19, use was made of PPS of which extract amount with methylene chloride exceeded the range of the present invention. The strengths at a weld part were remarkably lower than that in Example 17. In Comparison Example 20, use was made of PPS in which the amount of —SX groups was below the range of the present invention. The strength at a weld part was remarkably low, compared to that of Example 17. The molded article of Comparison Example 21 was same as that in Example 17, except that (B) was not blended in the composition. The strength at a weld part was remarkably low, compared to Example 17.

We claim:

1. A composition comprising 100 parts by weight of (A) a polyarylene sulfide and 0.01 to 5.0 parts by weight of (B) at least one silane compound, characterized in that the polyarylene sulfide comprises methylene chloride extractable components in an amount of not more than 0.7% by weight, has a melt viscosity, $V_6$, of 20 to 15,000 poises and a content of —SX groups of at least 15 micro moles/g, wherein X represents an alkali metal or a hydrogen atom, the silane compound being selected from the group consisting of methacryloxy silane compounds, ureido silane compounds and epoxy silane compounds.

2. The composition claimed in claim 1, wherein the composition further comprises an inorganic filler in an

TABLE 5

|  | Example | | | | | Comparison Example | | | |
| --- | --- | --- | --- | --- | --- | --- | --- | --- | --- |
|  | 17 | 18 | 19 | 20 | 21 | 18 | 19 | 20 | 21 |
| PPS |  |  |  |  |  |  |  |  |  |
| Type of PPS | P-16 | P-17 | P-17 | P-17 | P-17 | P-18 | P-19 | P-20 | P-16 |
| Extract with Methylene Chloride, wt. % | 0.48 | 0.50 | 0.50 | 0.50 | 0.50 | 1.24 | 1.11 | 0.52 | 0.48 |
| -SX groups, μmol/g | 21 | 22 | 22 | 22 | 22 | 24 | 23 | 13 | 21 |
| Melt Viscosity, $V_6$, poise | 970 | 880 | 880 | 880 | 880 | 820 | 1020 | 1440 | 970 |
| Resin Composition |  |  |  |  |  |  |  |  |  |
| PPS, part by weight | 100 | 100 | 100 | 100 | 100 | 100 | 100 | 100 | 100 |
| Epoxy Type Silane Coupling Agent, part by weight | 0.4 | 0.4 | 0.7 | 1.0 | 0.4 | 0.4 | 0.4 | 0.4 | 0 |
| Glass fiber, part by weight | 67 | 67 | 67 | 67 | 67 | 67 | 67 | 67 | 67 |
| Strength at a weld part |  |  |  |  |  |  |  |  |  |
| Tensile Strength, (kgf/cm$^2$) | 650 | 700 | 740 | 760 | 760 | 500 | 440 | 520 | 470 |
| Impact Strengh, (kgf · cm/cm) | 60 | 63 | 67 | 70 | 66 | 52 | 45 | 53 | 48 |

*Use was made of τ-glycidoxypropyltrimethyoxysilane in Examples 1 to 4 and Comparison Examples 1 to 4, and β-(3,4-epoxycyclohexyl)ethyltrimethoxysilane in Example 5.

amount of at most 400 parts by weight per 100 parts by weight of the polyarylene sulfide.

3. The composition claimed in claim 2, wherein the amount of the inorganic filler is 0.01 to 200 parts by weight per 100 parts by weight of the polyarylene sulfide.

4. The composition claimed in claim 1, wherein the amount of (B) the silane compound is 0.05 to 3.0 parts by weight.

5. The composition claimed in claim 1, wherein the mount of (B) the silane compound is 0.1 to 2.0 parts by weight.

6. The composition claimed in claim 1, wherein the silane compound (B) is a coupling agent.

7. The composition claimed in claim 1, wherein the silane compound (B) is selected from the group consisting of methacryloxy silane compounds and ureido silane compounds.

8. The composition claimed in claim 1, wherein the methacryloxy silane compounds are selected from the group consisting of gamma-methacryloxypropyltrimethoxysilane, gamma-methacryloxypropyltriethoxysilane, gamma-methacryloxypropylmethyldiethoxysilane and gamma-methacryloxypropylmethyldimethoxysilane.

9. The composition claimed in claim 1, wherein the ureido silane compounds are selected from the group consisting of gamma-ureidopropyltriethoxy silane, gamma-ureidopropyltrimethoxy silane and gamma-(2-ureido ethyl) aminopropyltrimethoxysilane.

10. The composition claimed in claim 1, wherein the epoxy silane compounds are selected from the group consisting of gamma-glycidoxypropyltrimethoxysilane, gamma-glycidoxypropyltriethoxysilane, beta-(3,4-epoxycyclohexyl)ethyltrimethoxysilane, gamma-glycidoxypropylmethyldiethoxysilane and gamma-glycidoxypropylmethyldimethoxysilane.

11. A molded article having a weld part, obtained by injection molding the composition claimed in claim 1, wherein the silane compound (B) is an epoxy silane compound.

12. The molded article claimed in claim 11, wherein the composition further comprises an inorganic filler in an amount of at most 400 parts by weight per 100 parts by weight of the polyarylene sulfide.

13. The molded article claimed in claim 11, wherein the composition further comprises an inorganic filler in an amount of 0.01 to 200 parts by weight per 100 parts by weight of the polyarylene sulfide.

14. The molded article claimed in claim 11, wherein the epoxy silane compounds are selected from the group consisting of gamma-glycidoxypropyltrimethoxysilane, gamma-glycidoxypropyltriethoxysilane, beta-(3,4-epoxycyclohexyl)ethyltrimethoxysilane, gamma-glycidoxypropylmethyldiethoxysilane and gamma-glycidoxypropylmethyldimethoxysilane.

15. The molded article claimed in of claim 11, wherein the injection molding is carried out by injecting the composition into a mold through at least two gates per one molded article.

* * * * *